United States Patent
Forsman et al.

(10) Patent No.: US 12,363,593 B2
(45) Date of Patent: Jul. 15, 2025

(54) METHOD AND DEVICE FOR ASSIGNING DATA CAPACITY TO NETWORK SLICES IN A MOBILE COMMUNICATIONS NETWORK

(71) Applicant: Telefonaktiebolaget LM Ericsson (publ), Stockholm (SE)

(72) Inventors: Mats Forsman, Rönninge (SE); Annikki Welin, Solna (SE); Tomas Thyni, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 316 days.

(21) Appl. No.: 18/002,259

(22) PCT Filed: Jul. 3, 2020

(86) PCT No.: PCT/SE2020/050706
§ 371 (c)(1),
(2) Date: Dec. 16, 2022

(87) PCT Pub. No.: WO2022/005352
PCT Pub. Date: Jan. 6, 2022

(65) Prior Publication Data
US 2023/0345307 A1    Oct. 26, 2023

(51) Int. Cl.
*H04W 28/20* (2009.01)
*H04L 41/40* (2022.01)

(52) U.S. Cl.
CPC .......... *H04W 28/20* (2013.01); *H04L 41/40* (2022.05)

(58) Field of Classification Search
CPC . H04W 28/0247; H04W 75/51; H04W 76/11; H04W 40/20; H04L 47/805; H04L 47/80; H04L 47/801
See application file for complete search history.

(56) References Cited

U.S. PATENT DOCUMENTS

2017/0164349 A1* 6/2017 Zhu ............... H04W 40/20
2018/0242304 A1* 8/2018 Rong ............ H04W 28/0247
(Continued)

FOREIGN PATENT DOCUMENTS

CN          110167051 A     8/2019
WO    WO-2019048048 A1 *  3/2019   ......... H04L 41/0823
(Continued)

OTHER PUBLICATIONS

International Search Report and Written Opinion for Application No. PCT/SE2020/050706, May 17, 2021, 11 pages.
(Continued)

*Primary Examiner* — Mahran Y Abu Roumi
(74) *Attorney, Agent, or Firm* — Nicholson De Vos Webster & Elliott LLP

(57) ABSTRACT

A method of assigning data capacity to network slices in a mobile communications network comprises acquiring identifiers of the network slices managed by a device, an indication of types of services being provided in the identified network slices, number of data radio bearers (DRBs) served by each network slice and number of DRBs served by each service type in each network slice; adding the acquired identifiers, indication of types of services being provided, number of DRBs served by each network slice and number of DRBs served by each service type in each network slice; computing a slice weight for the data capacity to be assigned as a product of an initial weight indicating the data capacity being assigned and the number of DRBs divided by a sum; and assigning the data capacity to said each network slice in accordance with the computed slice weight.

20 Claims, 9 Drawing Sheets

(56) References Cited

U.S. PATENT DOCUMENTS

2020/0374947 A1* 11/2020 Jin ..................... H04W 88/085
2025/0063387 A1* 2/2025 Sen ..................... H04W 24/02
2025/0063388 A1* 2/2025 Taneja ................. H04W 24/08

FOREIGN PATENT DOCUMENTS

WO     2020/063404 A1     4/2020
WO     2020/064697 A1     4/2020

OTHER PUBLICATIONS

Sina Khatibi et al., "Elastic Slice-Aware Radio Resource Management with AI-Traffic Prediction," 2019, 5 pages, European Conference on Networks and Communications (EuCNC).
Oscar Adamuz-Hinojosa et al., "Sharing gNB components in RAN slicing: A perspective from 3GPP/NFV standards," 2019, 7 pages, IEEE Conference on Standards for Communications and Networking (CSCN).
3GPP TR 28.809 V0.4.0, "3rd Generation Partnership Project; Technical Specification Group Services and System Aspects; Management and orchestration; Study on enhancement of Management Data Analytics (MDA) (Release 17)," Jun. 2020, 49 pages, 3GPP Organizational Partners.
European search report and Search Opinion, EP App. No. 20943365.5, Aug. 10, 2023, 9 pages.
International Preliminary Report on Patentability, PCT App. No. PCT/SE2020/050706, Jan. 12, 2023, 8 pages.

* cited by examiner

METHOD AND DEVICE FOR ASSIGNING DATA CAPACITY TO NETWORK SLICES IN A MOBILE COMMUNICATIONS NETWORK

CROSS-REFERENCE TO RELATED APPLICATIONS

This application is a National stage of International Application No. PCT/SE2020/050706, filed Jul. 3, 2020, which is hereby incorporated by reference.

TECHNICAL FIELD

The present disclosure relates to methods and devices for assigning data capacity to network slices in a wireless communications network.

BACKGROUND

New architectures such as centralized radio access networks (C-RANs) for data packet communication using evolved Common Public Radio Interface (eCPRI) with switched fronthaul and higher layer split (HLS) over F1 interface and with new functional distribution will impact requirements on data packet transport. Network slicing and an increased level of automation will also impact the transport.

A RAN transport network implementing network slicing must be capable of handling a large variation of users/slices in cells including different service requirements being offered with different type of slices, such as massive Internet of Things (MIoT), massive machine type communication (MMTC), public safety communications, enhanced mobile broadband (eMBB), etc.

When implementing network slicing in a communications network, each node in the communications network over which slice data is transported must be capable of correctly handling the slice data for the network slicing to be successfully implemented end-to-end.

SUMMARY

One objective is to improve the handling of network slices in a mobile communications network.

In a first aspect, a method of a device of assigning data capacity to network slices in a mobile communications network is provided. The method comprises acquiring identifiers of the network slices managed by the device, an indication of types of services being provided in the identified network slices, number of data radio bearers (DRBs) served by each network slice and number of DRBs served by each service type in each network slice, adding the acquired identifiers, indication of types of services being provided, number of DRBs served by each network slice and number of DRBs served by each service type in each network slice in a header of a transport protocol utilized in the mobile communication network, computing a slice weight for the data capacity to be assigned to each network slice as a product of an initial weight indicating the data capacity being assigned to said each network slice and the number of DRBs served by said each network slice divided by a sum, for all network slices managed by the device, of the product of the initial weight indicating the data capacity being assigned to an individual network slice and the number of DRBs served by the individual network slice, and assigning the data capacity to said each network slice in accordance with the computed slice weight.

In a second aspect, a device configured to assign data capacity to network slices in a mobile communications network is provided. The device comprises a processing unit and a memory, said memory containing instructions executable by said processing unit, whereby the device is operative to acquire identifiers of the network slices managed by the device, an indication of types of services being provided in the identified network slices, number of DRBs served by each network slice and number of DRBs served by each service type in each network slice, add the acquired identifiers, indication of types of services being provided, number of DRBs served by each network slice and number of DRBs served by each service type in each network slice in a header of a transport protocol utilized in the mobile communication network, compute a slice weight for the data capacity to be assigned to each network slice as a product of an initial weight indicating the data capacity being assigned to said each network slice and the number of DRBs served by said each network slice divided by a sum, for all network slices managed by the device, of the product of the initial weight indicating the data capacity being assigned to an individual network slice and the number of DRBs served by the individual network slice, and to assign the data capacity to said each network slice in accordance with the computed slice weight.

In a third aspect, a method of a device of assigning data capacity to network slices in a mobile communications network. The method comprises acquiring identifiers of the network slices managed by the device, an indication of types of services being provided in the identified network slices, number of DRBs served by each network slice and number of DRBs served by each service type in each network slice available in a header of a transport protocol utilized in the mobile communication network, computing a slice weight for the data capacity to be assigned to each network slice as a product of an initial weight indicating the data capacity being assigned to said each network slice and the number of DRBs served by said each network slice divided by a sum, for all network slices managed by the device (117), of the product of the initial weight indicating the data capacity being assigned to an individual network slice and the number of DRBs served by the individual network slice, and assigning the data capacity to said each network slice in accordance with the computed slice weight.

In a fourth aspect, a device configured to assign data capacity to network slices in a mobile communications network is provided. The device comprises a processing unit and a memory, said memory containing instructions executable by said processing unit, whereby the device is operative to acquire identifiers of the network slices managed by the device, an indication of types of services being provided in the identified network slices, number of DRBs served by each network slice and number of DRBs served by each service type in each network slice available in a header of a transport protocol utilized in the mobile communication network, compute a slice weight for the data capacity to be assigned to each network slice as a product of an initial weight indicating the data capacity being assigned to said each network slice and the number of DRBs served by said each network slice divided by a sum, for all network slices managed by the device, of the product of the initial weight indicating the data capacity being assigned to an individual network slice and the number of DRBs served by the individual network slice, and to assign the data capacity to said each network slice in accordance with the computed slice weight.

Advantageously, in a mobile communications system where many nodes or entities are not capable of handling network slicing; by having a node or entity being capable of doing so adding identifiers of network slices and the type of services deployed in the network in a header of a transport protocol, all nodes or entities will become "slice aware". Further, by also adding DRBs in use in each network slice and for each service type, it is advantageously possible to compute a slice weight and optionally a service type weight on which data capacity to be assigned to slices and service types is based.

In an embodiment, the computing of the slice weight further comprises taking into account an available data capacity of the device with respect to a maximum data capacity of the device.

In an embodiment, it is further proposed to compute a service type weight for the data capacity to be assigned to each service type in each network slice as a product of an initial weight indicating the data capacity being assigned to said each service type in each network slice and the number of DRBs served said each service type in each network slice divided by the sum, for all service types in each network slice managed by the device, of the product of the initial weight indicating the data capacity being assigned to an individual service type in each network slice and the number of DRBs served by the individual network slice, and assigning the data capacity to said each service type in each network slice in accordance with the computed service type weight.

In an embodiment, the computing of the service type further comprises taking into account an available data capacity of the device with respect to a maximum data capacity of the device.

In an embodiment, the assigning of the data capacity to said each service type in each network slice in accordance with the computed service type weight further comprises taking into account a minimum allowable data capacity to be assigned, wherein in case the computed service type weight for any network service type of a particular network slice indicates that less than the minimum allowable data capacity is to be assigned, data capacity is reallocated from one or more other network service types of said particular network slice such that the data capacity assigned to said any network slice is not below the minimum allowable data capacity.

In an embodiment, the assigning of the data capacity to said each service type in each network slice in accordance with the computed service type weight further comprises taking into account a maximum allowable data capacity to be assigned, wherein in case the computed service type weight for any network service type of a particular network slice indicates that more than the maximum allowable data capacity is to be assigned, data capacity is reallocated one or more other network service types of said particular network slice such that the data capacity assigned to said any network slice does not exceed the maximum allowable data capacity.

In an embodiment, the assigning of the data capacity to said each network slice in accordance with the computed slice weight further comprises taking into account a minimum allowable data capacity to be assigned, wherein in case the computed slice weight for any network slice indicates that less than the minimum allowable data capacity is to be assigned, data capacity is reallocated from one or more other network slices such that the data capacity assigned to said any network slice is not below the minimum allowable data capacity.

In an embodiment, the assigning of the data capacity to said each network slice in accordance with the computed slice weight further comprises taking into account a maximum allowable data capacity to be assigned, wherein in case the computed slice weight for any network slice indicates that more than the maximum allowable data capacity is to be assigned, data capacity is reallocated from said any network slice to one or more other network slices such that the data capacity assigned to said any network slice does not exceed the maximum allowable data capacity.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown.

These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Figure 1:
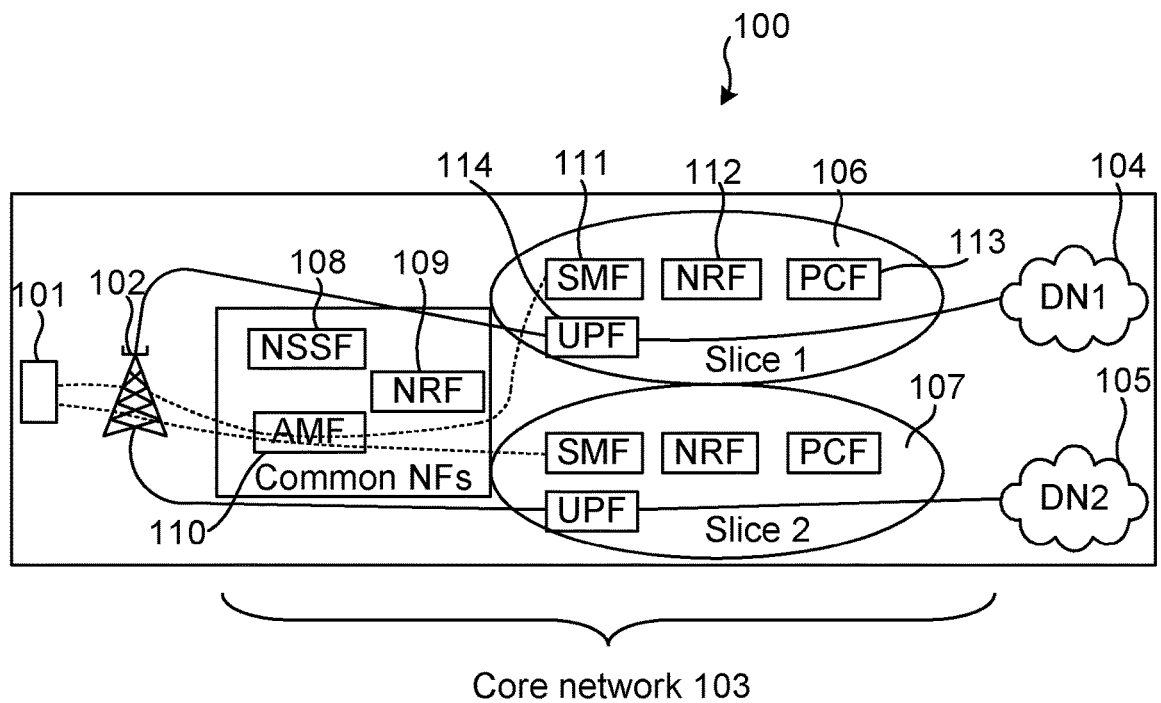
FIG. 1 schematically illustrates a mobile communications network 100 in which network slicing is implemented.

FIG. 1 schematically illustrates a mobile communications network 100 in which network slicing is implemented. A mobile communication device 101, commonly referred to as a User Equipment (UE) being for instance a smart phone, a tablet, a connected vehicle etc., connects via a radio base station (RBS) 102 forming a RAN to a core network 103 and further on to a first data network (DN1) 104 and a second data network (DN2) 105 via a respective network slice 106, 107 referred to as Slice 1 and Slice 2.

The core network 102 comprises a number of network functions (NF), some being common for all network slices 106, 107, such as a Network Slice Selection Function (NSSF) 108 for handling network slicing, a Network Function Repository Function (NRF) 109 for providing discovery and registration functionality for NFs and a core network control plane function configured to provide mobility management in the form of an Access and Mobility Function (AMF) 110 for providing UE-based authentication, authorization, mobility management, etc.

Further, each slice 106, 107 comprises a core network control plane function configured to provide session management in the form of a Session Management Function (SMF) 111 configured to perform session management, e.g. session establishment, modify and release, etc. Each slice further comprises an NRF 112, a Policy Control function (PCF) 113 providing policy rules to control plane functions to enforce the policies, and a User Plane function (UPF) 114 serving as a Protocol Data Unit (PDU) session point for interconnection to the data networks, which PDU session forms an association between the UE 101 and DN1 and DN2 that provides a PDU connectivity service. The type of association can be IP, Ethernet or unstructured.

Each slice 106, 107 may serve a particular service type with an agreed service-level agreement (SLA). For instance, Slice 1 may serve a critical enterprise application, e.g. remote surgery, using ultra-reliable low latency communication (uRLLC), while Slice 2 may serve private mobile subscribers which for instance use mobile broadband type of services such as eMBB to surf on their UEs.

A network slice is identified by a piece of Single-Network Slice Selection Assistance Information (S-NSSAI), while an NSSAI set is an aggregation of a plurality of sets of S-NSSAI. A single UE may be served by multiple network slices simultaneously. The NSSAI is sent in signalling messages between the UE 101 and the core network 102 to identify the slices serving the UE 101.

The S-NSSAI comprises:
a slice identifier referred to as a slice differentiator (SD), and
an identifier of a slice service type (SST) provided by the slice (each slice may provide a plurality of different service types).

For example, standardized values have been proposed; an SST value of "1" indicates that the service type is eMBB, an SST value of "2" indicates uRLLC, an SST value of "3" indicates MIoT, etc.

Figure 2:
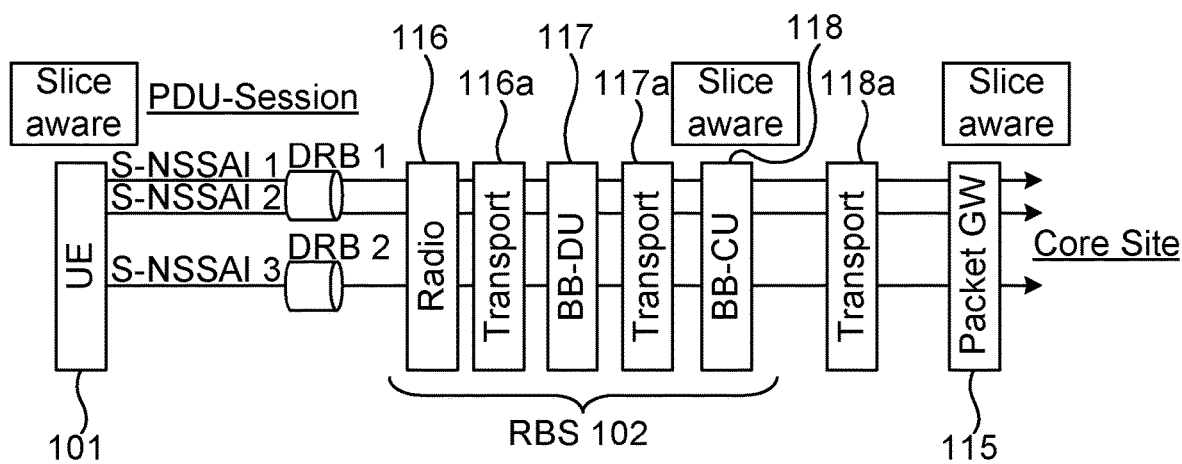
FIG. 2 illustrates a data packet flow from a mobile terminal over a radio base station and on to a core network interfacing to the radio base station via a packet gateway.

FIG. 2 illustrates a data packet flow from the UE 101 over the RBS 102 and on to the core network 103 interfacing to the RBS 102 via a Packet Core Gateway (PGW) 115 (or a UPF in case of 5G).

As is illustrated in FIG. 2, the UE 101 sets up three PDU sessions, each PDU session utilizing separate network slices (not shown) as indicated by S-NSSAI 1, S-NSSAI 2 and S-NSSAI 3. Two PDU sessions are established via a first data radio bearer (DRB 1), while one PDU session is set up via DRB 2.

Now, the UE 101 is "slice aware", i.e. capable of handling network slicing. However, following the transmission of data in an uplink direction (or the receiving of data in a downlink direction), it is illustrated that a radio unit 116 of the RBS 102 is not slice aware. Further, the data of the radio 116 is transported over a first transport device 116a, such as e.g. a router or a switch, before reaching a baseband-distributed unit (BB-DU) 117 which is also not slice aware before again being transported via second transport device 117a to a baseband-centralized unit (BB-CU) 118 which indeed is capable of handling network slices. Finally, the data is transported over the RAN via a third transport device 118a to the core network 102 via the PGW 115 which is also slice aware.

As is understood, if not all nodes (or individual entities over via data is transferred in a node such as the radio 116, the BB-CU 117, the BB-DU 118, the transport devices 116a, 117a, 118a, the PGW/UPF 115, etc.) are capable of handling network slices, then the network slicing handling will fail. Next-Generation (NG) RAN, is slice aware at the PDU session level, i.e. at the UE 101 and the BB-CU 117, as well as in the core network 103 since the S-NSSAI is included in control signalling messages containing PDU session information.

A proposed security solution for data transport over the RAN is based on media access control security (MACsec). MACsec is an 802.1AE IEEE industry-standard security technology providing secure communication for all traffic on Ethernet links. MACsec provides point-to-point security on Ethernet links between directly connected nodes and can identify and prevent most security threats, including denial of service, intrusion, man-in-the-middle, masquerading, passive wiretapping, and playback attacks. Multi-hop MACsec is also possible by using so-called provider bridges, which generally is performed by adding a stacked virtual local area network (S-VLAN) tag in front of an MACsec tag. MACsec can thus secure fronthaul eCPRI links. MACsec can also be used in combination with other security protocols such as IP Security (IPsec) or Secure Sockets Layer (SSL) to provide end-to-end network security.

CPRI is widely used in mobile network and is intended for point-to-point transmission links, making the fronthaul very inflexible. The eCPRI is a multipoint fronthaul transmission which makes transport more flexible and efficient. Further Mobile Backhaul (over Ng) and HLS (over F1) are multipoint transport technologies. For all these multipoint protocols/interfaces, the transport network is still slice unaware and thus cannot adapt to network slicing requirements or conditions.

In embodiments, the required slice information is included in the transport protocol being utilized in the network as will be discussed in the following.

By mapping the S-NSSAI into transport protocol headers, any node or entity in the node is enabled to identify data associated with a network slice—by means of the above-discussed SD—and the related characteristics of the slice—by means of the SST. In other words, by mapping the S-NSSAI into transport protocol headers and any node or entity will advantageously become slice aware by reading the header. As is understood, the RBS 102 may consist of various functions being integrated in an entity within the RS 102, or may alternatively have functions distributed over a variety of entities within the RBS 102.

Further, by also collecting dynamic information on number of UE DRBs in use, slice information and dynamical data is advantageously utilized to adapt slice weights in the hierarchical transport scheduler and thereby dynamically adapt and optimize scheduling to give best possible network performance and fairness for each slice while ensuring correct end-to-end slice handling.

Figure 3A:
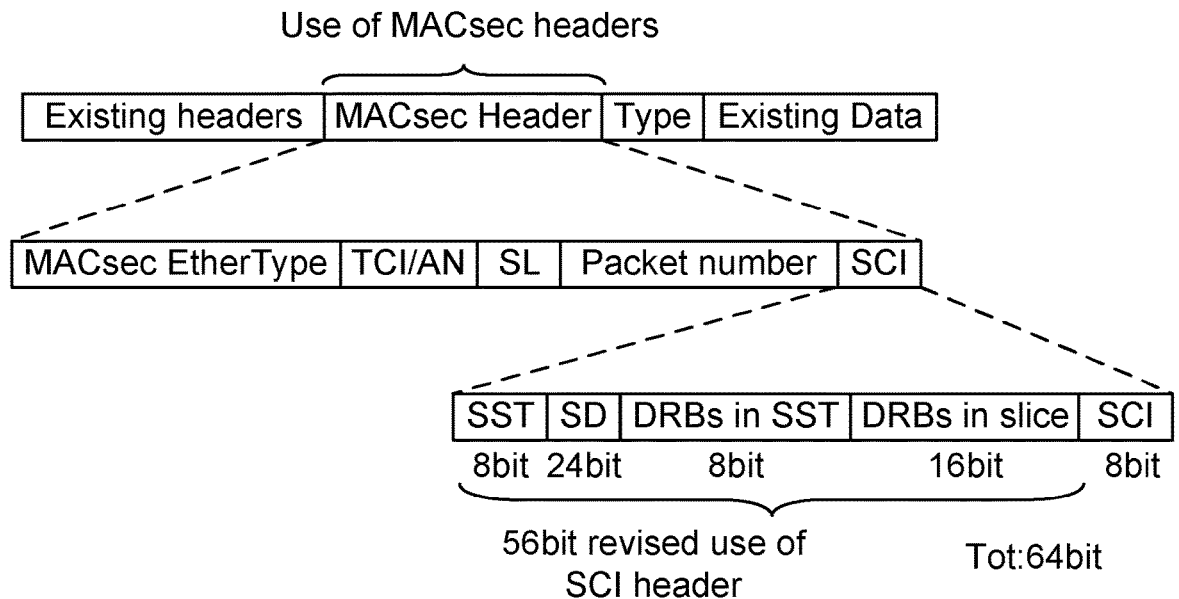
FIGS. 3a-h illustrates different types of transport protocol headers where required data for slice awareness is included according to embodiments.

FIG. 3a illustrates a MACsec header where required data is included in an embodiment. The respective header field is defined as follows.

MACsec EtherType: the first two octets (one octet is 8 bits) designate that the following frame is a MACsec frame.

TCI/AN: The third octet is the TAG Control Information (TCI)/Association Number field. The TCI designates the MACsec version number, if confidentiality or integrity are used alone.

SL: The fourth octet is set to the length of the encrypted data.

PN: Octets 5 through 8 are the packet number and are used for replay protection and the construction of the initialization vector (along with the secure channel identifier [SCI]).

SCI: Octets 9 through 16 are the secure channel identifier. Each connectivity association (CA) is a virtual port and each virtual port is designated a secure channel identifier that is the concatenation of the MAC address of the physical interface and a 16-bit port ID.

In this embodiment, a section of the 64-bit SCI field of the MACsec header is used such that (1) the first octet of the SCI field comprises the SST, (2) the following three octets comprises the SD, (3) the fifth octet comprises the number of DRBs used for the SST, (4) the following two octets comprises the numbers of DRBs used in total for the slice, while (5) the last octet comprises the SCI.

Currently, the SCI identifier is created from the physical port MAC address and a port-ID number. It is noted that the number of DRBs used for the SST and the total numbers of DRBs in use for the slice is dynamic information which may change with each node or even with each entity in a node.

Thus, the S-NSSAI (i.e. the SST and the SD) needs to be identified for each PDU session being established as illustrated in FIG. 2.

Further, the dynamically changing number of UE bearers, i.e. DRBs, in use in each slice and for each SST needs to be identified. It is noted that for a given slice and/or service type, DRBs are continuously established and terminated, which needs to be taken into account.

Initially, a slice aware node or entity must add the information to the transport protocol header, such as the BB-CU 118, both for uplink and downlink data transmission. Once the information is included in the transport protocol header, any node or entity is made slice aware by acquiring the data from the header. The BB-CU 118 has access to control plane information for network slicing and signals the information to be added to the transport protocol header to the radio 116 and to the BB-DU 117. The PGW 115 (or alternatively a UPF) generally does not have access to number of DRBs being established but reads this information from the transport protocol header in the uplink and copies the information in the downlink for the same PDU session.

Thereafter, the identification of the S-NSSAI of each established PDU session and number of DRBs used for an SST and SD may be performed e.g. at the RAN endpoints of the RBS 102, i.e. at the radio 116 or the BB-CU 118, or in the core network, for example at the PGW 115, and is included in the SCI field of the MACsec header as illustrated in FIG. 3a.

It may be envisaged that the radio 116, the BB-DU 117, etc.—after having been made slice aware by for instance the BB-CU 118 and thus is capable of adding the required information to the header—identifies the S-NSSAI (i.e. SST and SD) in the uplink and also identifies the dynamically changing DRBs in use for each slice and service type and updates the SCI field of the MACsec header accordingly, while for instance the PGW performs the task in the downlink.

Figure 3B:
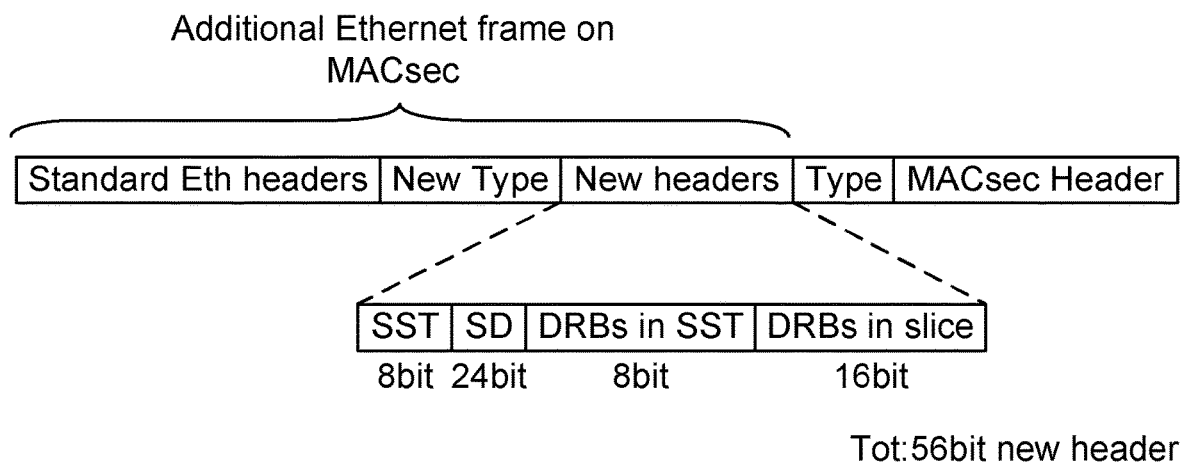

FIG. 3b illustrates an Ethernet frame being added to a MACsec header where required data is included in an embodiment. The respective header field is defined as follows. That is, an Ethernet frame with a new EtherType is added before the MACsec header.

Figure 3C:
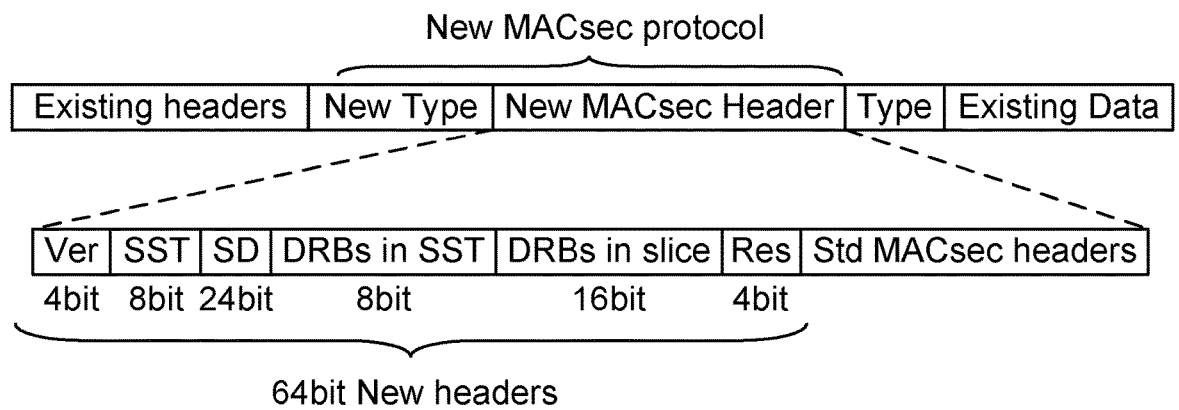

FIG. 3c illustrates a defined new MACsec header where required data is included in an embodiment. The respective header field is defined as follows (not describing already described fields). The first field is a version field and ver=0 would indicate and old MACsec protocol without slice header, while ver=1 would indicate a new slice aware version. We propose to map the slice information into new MACsec header as the following. Res indicates a 4-bit reserved field to achieve full octets in the header.

Figure 3D:
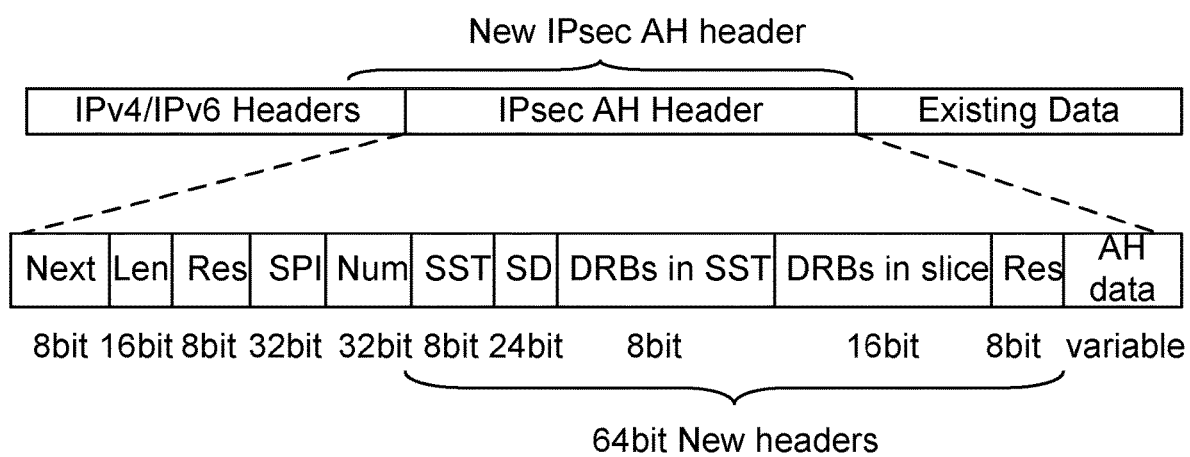

FIG. 3d illustrates a new Internet Protocol security (IPsec) Authentication Header (AH) where required data is included in an embodiment. The respective header field is defined as follows (not describing already described fields). Next contains the protocol number of the next header after the AH. Len measures the length of the AH itself. Res is reserved. SPI denotes Security Parameter Index. Num is sequence number. AH data contains the result of the hashing algorithm performed by the AH protocol.

Figure 3E:
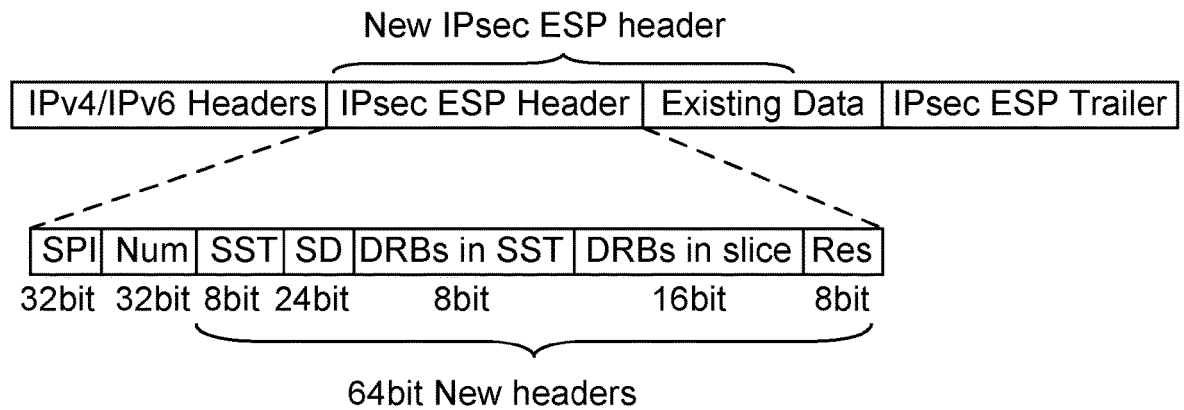

FIG. 3e illustrates a new IPsec Encapsulating Security Payload (ESP) header where required data is included in an embodiment.

Figure 3F:
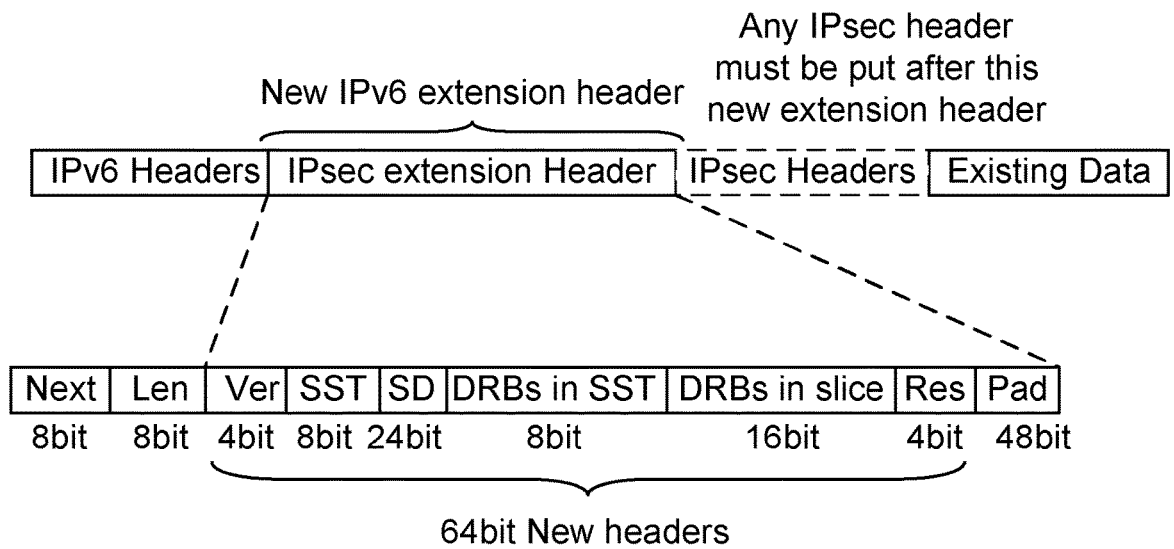

FIG. 3f illustrates a new IPv6 extension header where required data is included in an embodiment.

Figure 3G:
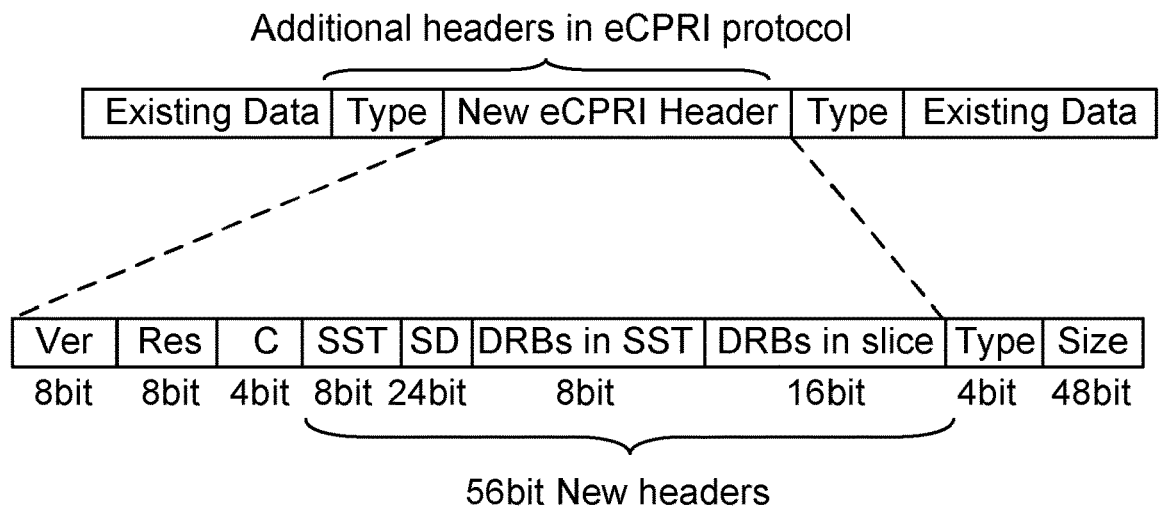

FIG. 3g illustrates a new eCPRI header where required data is included in an embodiment. The respective header field is defined as follows (not describing already described fields). C is the eCPRI messages concatenation indicator. Type indicates the type of service conveyed by the message. Size is the size in bytes of the payload.

Figure 3H:
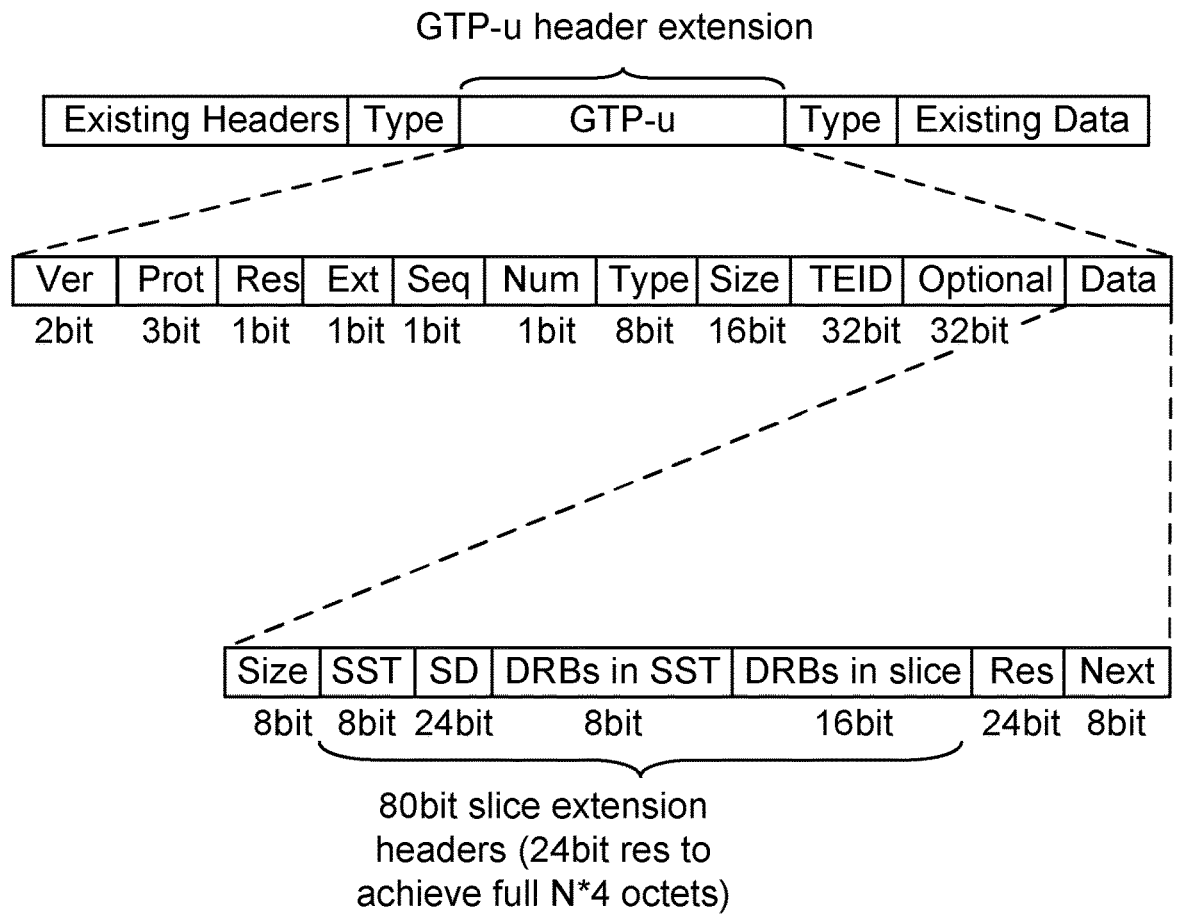

FIG. 3h illustrates a new extension header to an existing GPRS ("General Packet Radio Services") Tunnelling Protocol User Plane (GTP-u) protocol where required data is included in an embodiment. The respective header field is defined as follows (not describing already described fields). Prot defines protocol type. Ext defines whether there is an extension header optional field. TEID denotes Tunnel Endpoint Identifier, and the data field is where the required data is included.

Figure 4:
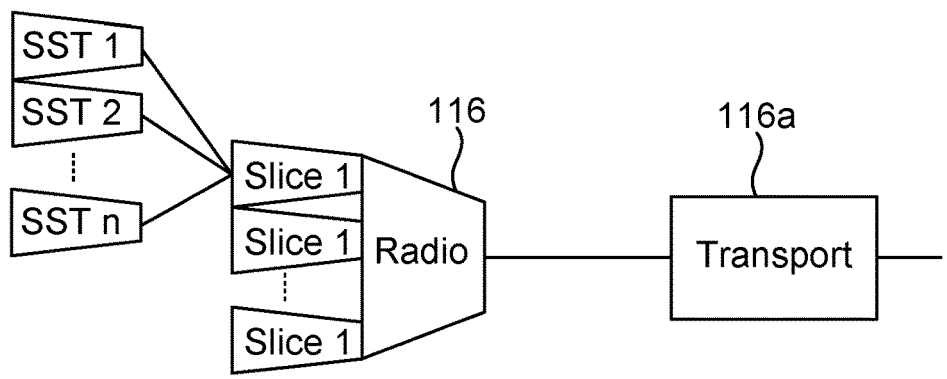
FIG. 4 illustrates a transport interface according to an embodiment.

FIG. 4 illustrates a RAN transport interface of the RBS 102, such as the radio 116, communicating in the uplink with the first transport device 116a. For instance, the radio 116 may be equipped with an optical interface capable of handling a maximum of 10 Gbps. Now, the radio 116 (and thus the RBS 102) may serve a number of network slices Slice 1, 2, . . . m, and each network slice may in its turn provide various service types as defined by the SST included in the header.

Figure 5:
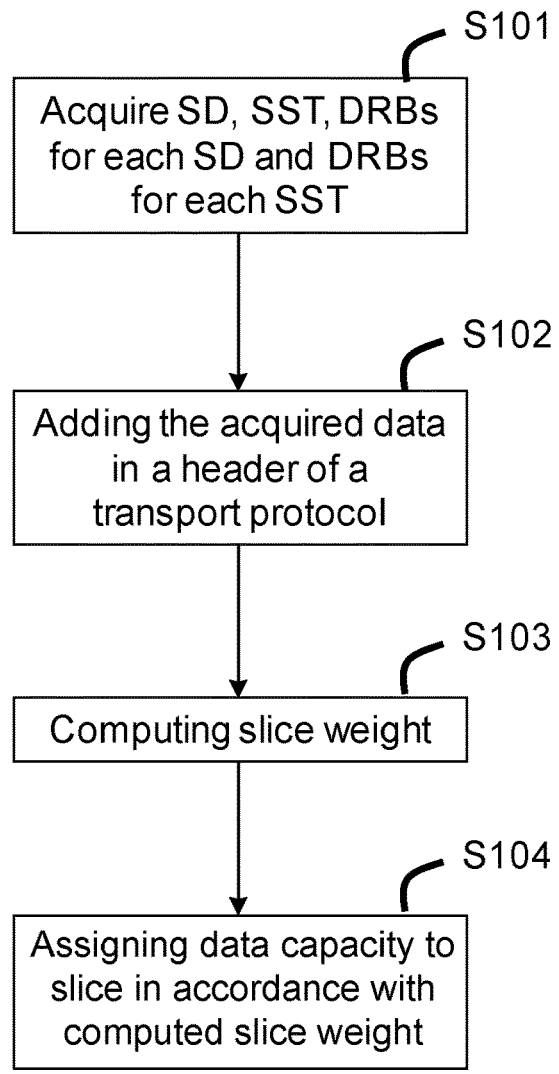
FIG. 5 illustrates a flowchart of a method of assigning data capacity to network slices according to an embodiment.

Reference will further be made to FIG. 5 illustrating a flowchart of a method of assigning data capacity to network slices according to an embodiment. In this exemplifying embodiment, the radio 116 is the device performing the method for uplink data transfer. However, as previously discussed, the method could alternatively be illustrated as being performed for instance by the BB-CU 118 in the downlink.

In a first step S101, the SD identifying a network slice is acquired along with the SST identifying a service type deployed in the slice, as well as the number of DRBs served by the slice and the number of DRBs served by the indicated service type for the slice.

Thereafter, in step S102, the SD, the SST, the number of DRBs served by the slice and the number of DRBs served by the indicated service type for the slice is added to the header.

As previously discussed, an SST value of "1" indicates that the service type is eMBB, an SST value of "2" indicates uRLLC, an SST value of "3" indicates MIoT, etc. Further, there is also a range of SST values for operators to use.

Thus, Slice 1 may for instance (a) provide eMBB for private mobile subscribers using their UEs to surf the Internet, (b) provide uRLLC to a hospital or police for critical communications, and (c) provide MIoT for a factory or industrial plant hosting a large population of IoT devices in the form of sensors, actuators, control devices, etc.

However, for e.g. the radio 116 to schedule resources for uplink data transmission via the first transport device 116*a* in a fair manner, the radio 116 needs to see to it that there is a balance between the slices in terms of data resources being scheduled to each slice, i.e. the data capacity being assigned to each slice. Assuming for instance that each network slice initially is assigned the same amount of resources, for instance that the radio 116 102 serves four slices in the uplink, where each slice is assigned $10/4=2.5$ Gbps (10 Gbps being the maximum capacity of the radio 116), i.e. each slice is scheduled to be assigned 25% of the data throughput capacity of the radio 116.

In this embodiment, the data capacity being assigned to the slices is computed in step S103 as:

$$SD_q(\text{weight recomp}) = \frac{SD_q(\text{weight } init) \times DRB(SD_q)}{\sum_{y=1}^{m} SD_y(\text{weight } init) \times DRB(SD_y)} \quad \text{equation (1)}$$

where:
- $SD_q$ identifies each network slice, where m is the total number of slices ($1 \leq q \leq m$),
- $SD_q$ (weight init) defines initial slice weight (in terms of data capacity) for network slice q; to be used by the scheduler in the radio 116,
- $DRB(SD_q)$ defines the number of DRBs assigned to network slice q, and
- $SD_q$ (weight recomp) defines recomputed, updated slice weight for network slice q; to be used by the scheduler in the radio 116 for uplink data transmission via the first transport device 116*a*.

Assuming for simplicity that the radio 116 only handles two slices: Slice 1 and Slice 2. In other words, the radio 116 schedules data capacity to be assigned to Slice 1 and Slice 2 for uplink transmission via the first transport device 116*a* (even though in practice the radio 116 may be responsible for scheduling resources to far more network slices). In this example, the two slices are assigned 50% each of the data throughput capacity of the radio 116, and each slice serves 1 DRB.

TABLE 1

Weight recomputations for Slice 1 and Slice 2.

| $SD_1$ (weight recomp) | $SD_2$ (weight recomp) | $SD_1$ (weight init) | $SD_2$ (weight init) | $DRB(SD_1)$ | $DRB(SD_2)$ |
|---|---|---|---|---|---|
| 0.5 | 0.5 | 0.5 | 0.5 | 1 | 1 |
| 0.67 | 0.33 | 0.5 | 0.5 | 2 | 1 |
| 0.83 | 0.17 | 0.5 | 0.5 | 5 | 1 |

Now as can be seen in the first row of Table 1, with evenly distributed DRBs over the slices, the recomputed value of the slice weight (using equation 1) will be the same as the initially set slice weight.

However, as unbalance starts occurring in terms of the number of DRBs being served by the slices, which will be the case in practice, data capacity assigned to the slices must be rescheduled by the radio 116. For instance, as can be seen in the second row of Table 1, if a further DRB is established for Slice 1, the result of the computation of equation 1 will be that ⅔ of the data capacity is assigned to Slice 1, while only ⅓ is assigned to Slice 2. Thus, in step S104, the radio 116 will assign data capacity for the network slices in accordance with the recomputed slice weight $SD_q$ (weight recomp) for the respective network slice $SD_q$.

If the recomputation would not be undertaken, the radio 116 would still perform a 50/50 data capacity scheduling for Slice 1 and Slice 2 even though Slice 1 serves twice the number of DRBs, which is not a balanced scheduling approach.

As has been discussed, the scheduling of resources by the radio 116 resulting in the initial slice weight of 2.5 Gbps (or 25%) for each one of the four slices and an initial SST weight 0.83 Gbps (or 33%) for Slice 1 is far from optimal in the above example.

As can be seen in the third row of Table 1, if 5 DRBs are served by Slice 1 while only one DRB is served by Slice 2, the result of the computation of equation 1 will be that ⅚ of the data capacity is assigned to Slice 1, while only ⅙ is assigned to Slice 2 as performed in step S104.

Advantageously, the scheduler of the radio 116 will dynamically adapt to changing conditions; as a network slice serves more DRBs than another network slice a greater amount will be assigned to that slice.

It should be noted that in the above example, a 50/50 initial data capacity distribution is scheduled for the two slices, but any distribution may in practice be scheduled, such as 90/10, if desired.

The initial slice weights may be set as stipulated for instance in the SLA of the network operator. If so, the initially set weights would typically only change when the SLA changes.

In a further embodiment, when recomputing the slice weight, the available data capacity of the physical interface of the radio 116 is taken into account:

$$SD_q(\text{weight recomp}) = \frac{SD_q(\text{weight } init) \times DRB(SD_q)}{\sum_{y=1}^{m} SD_y(\text{weight } init) \times DRB(SD_y)} \times DC_a \quad \text{equation (2)}$$

where:

DC$_a$ denotes the available data capacity of the radio 116.

Now, assuming that the radio 116 has a maximum data capacity of 10 Gbps and all the data capacity can be assigned to the network slices, then each slice would initially be assigned 5 Gbps as illustrated with reference to equation 1.

However, assuming that the available data capacity of the radio 116 is 75% of the maximum capacity for some reason, then each slice can initially only be assigned 3.75 Gbps.

After having performed the scheduling, i.e. after having assigned data capacity to slice 1 and Slice 2 in accordance with the recomputed slice weights (this is dynamically performed as the number of DRBs being established for the two network slices changes) in step S104, the process is repeated for the next entity within the RBS 102: the first transport device 116a, the BB-DU 117, the second transport device 117a, etc.

Typically, the BB-DU 117 serves a plurality of radios, and thus the BB-DU 117 may serve one or more other radios which also schedules data resources for Slice 1 and Slice 2. This implies that the BB-DU in its turn must compute weights for the scheduling of uplink data pertaining to the network slices it serves, and so on.

It is noted that this typically needs to be performed at each node/entity. Assuming for instance that the radio 116 handles 2 DRBs for a particular slice in the uplink; the BB-DU 117 may serve one or more further radio units (not shown in FIG. 2). For instance, if the BB-DU 117 serves another radio unit which also handles 2 DRBs for said particular slice in the uplink, then the BB-DU 117 must take into account that said particular slice serves a total of 4 DRBs in the uplink when recomputing the weight.

However, the information—i.e. SD, SST and the number of DRBs for each SD and SST—is already included in the headers by the respective radio, so the BB-DU 117 acquires the information already available in the headers and then recomputes the weight based on the acquired information; nevertheless, since the BB-DU 117 aggregates slice information from a number of radios, the slice information must be updated in the headers. Further, there may be a change in protocol at the BB-DU 117, for instance from MACsec to IPsec which must be handled. In an example, the transport protocol from the radio 116 to the BB-DU 117 may be MACsec, the transport protocol from the BB-DU 117 to the BB-CU 118 may be IPsec, while the transport protocol from the BB-CU 117 to the PGW/UPF 115 may be GTP-u.

Figure 7:
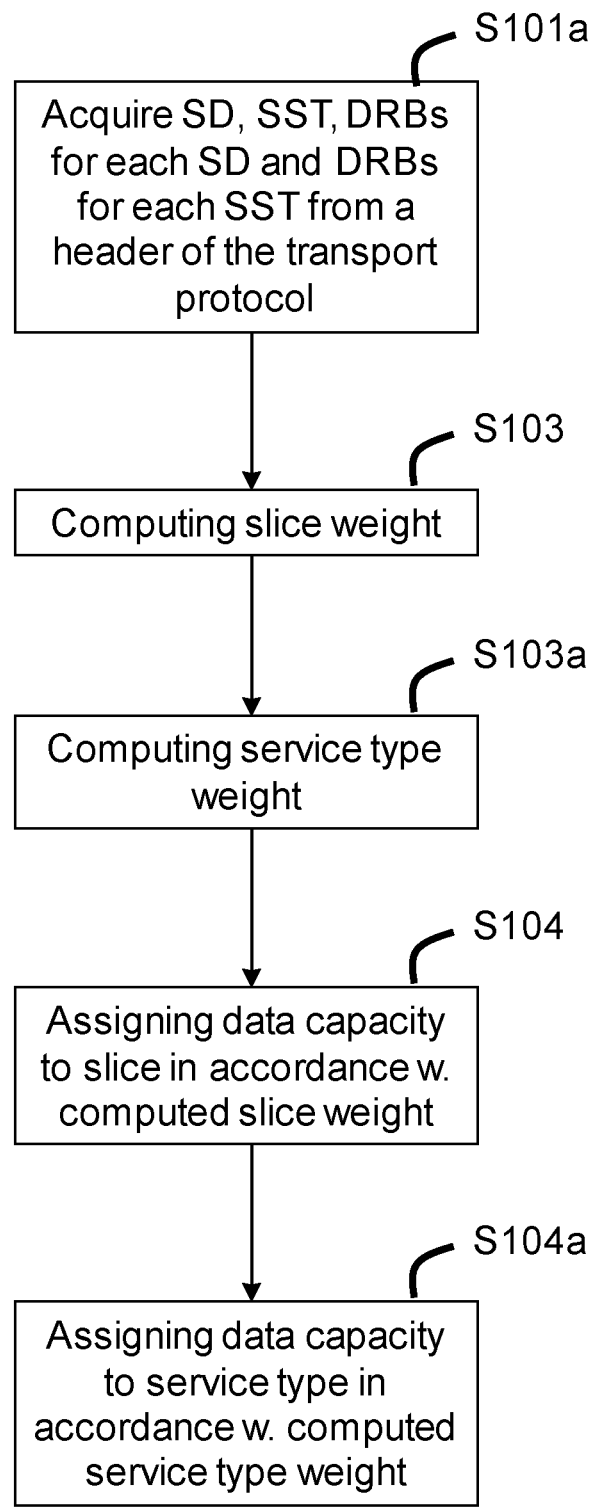
FIG. 7 illustrates a flowchart of a method of assigning data capacity to network slices according to an embodiment.

For nodes/entities which are not required to add slice and DRB information to a header of the transport protocol, which could be the case for instance for a transport device 117a, the process is slightly different as shown in FIG. 7. Such nodes/entities will in step S101a acquire the already available information—i.e. SD, SST and the number of DRBs for each SD and SST—from a transport protocol header in which the information already has been included. Thereafter, the remaining steps S103, S103a, S104, S104a may be performed as already has been described.

In a further embodiment, a minimum and/or maximum value for allowable data capacity being assigned to each slice is defined. For instance, one or both of these values may be defined by the network operator in an SLA.

As can be seen in the third row of Table 1, if 5 DRBs are served by Slice 1 while only one DRB is served by Slice 2, the result of the computation of equation 1 will be that 5/6 of the data capacity is assigned to Slice 1, while only 1/6 is assigned to Slice 2.

If for instance a maximum value for data capacity to be assigned is set to 80%, the radio 116 would instead perform the scheduling such that 80% of the data capacity is assigned to Slice 1, while 20% is assigned to Slice 2.

If for instance a minimum value for data capacity to be assigned is set to 20%, the radio 116 would instead perform the scheduling such that 75% of the data capacity is assigned to Slice 1, while 25% is assigned to Slice 2.

Now, in the above given embodiments, it is assumed that each network slice only provides one service type, i.e. there is only one SST value defined for each slice.

Figure 6:
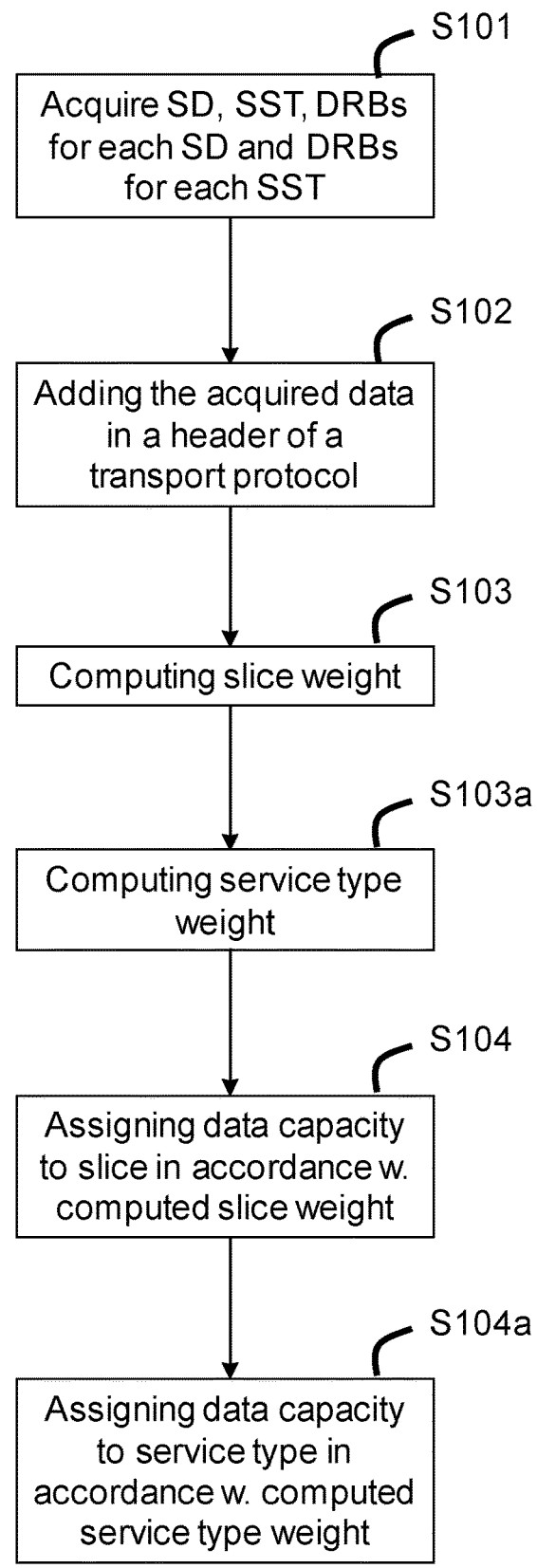
FIG. 6 illustrates a flowchart of a method of assigning data capacity to network slices according to another embodiment.

In the following embodiment, illustrated with reference to the flowchart of FIG. 6, it is assumed that each slice provides a plurality of different services defined by their respective SST value. Continuing the above example, the radio 116 handles two slices: Slice 1 and Slice 2. In this exemplifying embodiment, it is assumed that each of the two network slices provides the different types of services, where Slice 1 provides eMBB (i.e. SST=1) and uRLLC (i.e. SST=2), while Slice 2 provides eMBB and MIoT (i.e. SST=3).

In this embodiment, the data capacity being assigned to the different service types within each network slice is computed in step S103a as:

$$SST_p(\text{weight recomp}) = \frac{SST_p(\text{weight init}) \times DRB(SST_p) \times SD_q(\text{weight recomp})}{\sum_{x=1}^{n} SST_x(\text{weight init}) \times DRB(SST_x)} \quad \text{(equation 3)}$$

where:

SST$_p$ identifies the service type for a given network slice where n is the total number of service types in a slice (1≤p≤n), SST$_p$ (weight init) defines initial service type weight (in terms of data capacity) for service type p; to be used by the scheduler in the radio 116, DRB(SST$_p$) defines the number of DRBs assigned to service type p, and SST$_p$ (weight recomp) defines recomputed, updated service type weight for network slice p; to be used by the scheduler in the radio 116.

In this example, the Slice 1 and Slice 2 assigned 50% each of the data throughput capacity of the radio 116, and each slice serves 1 DRB. In Table 2 below, weight recomputations for SST1 and SST2 of Slice 1 are illustrated. SST1 and SST2 are both initially assigned 50% each of the capacity of Slice 1. Similar recomputations is performed for the service types of Slice 2.

TABLE 2

Weight recomputations for SST1 and SST2 of Slice 1.

| SST$_1$ (weight recomp) | SST$_2$ (weight recomp) | SD$_1$ (weight recomp) | SST$_1$ (weight init) | SST$_2$ (weight init) | DRB (SST$_1$) | DRB (SST$_2$) |
|---|---|---|---|---|---|---|
| 0.25 | 0.25 | 0.5 | 0.5 | 0.5 | 1 | 1 |
| 0.33 | 0.17 | 0.5 | 0.5 | 0.5 | 2 | 1 |
| 0.42 | 0.08 | 0.5 | 0.17 | 0.5 | 5 | 1 |

Now as can be seen in the first row of Table 1, with evenly distributed DRBs over the two SSTs, the recomputed value of the slice weight (using equation 1) will be half the initially set SST weight. In other words, since the slice weight of Slice 1 is 0.5, the recomputed weight for SST1 indicates that the service type indicated with SST1 is assigned 0.5 of the data capacity of Slice 1, which in this example equals 0.25 of the total data capacity of the radio 116.

However, as unbalance starts occurring in terms of the number of DRBs being served by the SSTs within Slice 1, which will be the case in practice, data capacity assigned to the SSTs for a given network slice must be rescheduled by the radio 116. For instance, as can be seen in the second row of Table 1, if a further DRB is established for SST1, the result of the computation of equation 3 will be that ⅓ of the data capacity of the radio 116 is assigned to SST1, while only ⅙ is assigned to SST2, as illustrated in step 104a.

As can be seen in the third row of Table 1, if 5 DRBs are served by SST1 while only one DRB is served by SST2, the result of the computation of equation 3 will be that 5/12 of the data capacity of the radio 116 is assigned to SST1, while only 1/12 is assigned to SST2.

Advantageously, the scheduler of the radio 116 will dynamically adapt to changing conditions; as a service type of a network slice serves more DRBs than another service type in the network slice a greater amount will be assigned to that service type.

In yet further embodiment, in line with what has been discussed for previous embodiments, the available data capacity of the radio 116 may be taken into account for the recomputation of the service type weight by multiplying equation 3 with $DC_a$, thereby taking into account the available network slice data capacity provided by the radio 116 to each slice.

In a further embodiment, a minimum and/or maximum value for allowable data capacity being assigned to each service type within a slice is defined. For instance, one or both of these values may be defined by the network operator in an SLA.

As can be seen in the third row of Table 2, if 5 DRBs are served by SST1 while only one DRB is served by SST2, the result of the computation of equation 3 will be that 5/12 of the data capacity of the radio 116 is assigned to SST1, while only 1/12 is assigned to SST2.

If for instance a maximum value for data capacity to be assigned is set to 90%, the radio 116 would instead perform the scheduling such that 90% of the data capacity is assigned to SST1 of Slice 1, while 10% is assigned to SST2 of Slice 1.

If for instance a minimum value for data capacity to be assigned is set to 15%, the radio 116 would instead perform the scheduling such that 85% of the data capacity is assigned to SST1 of Slice 1, while 15% is assigned to SST1 of Slice 1.

Figure 8:
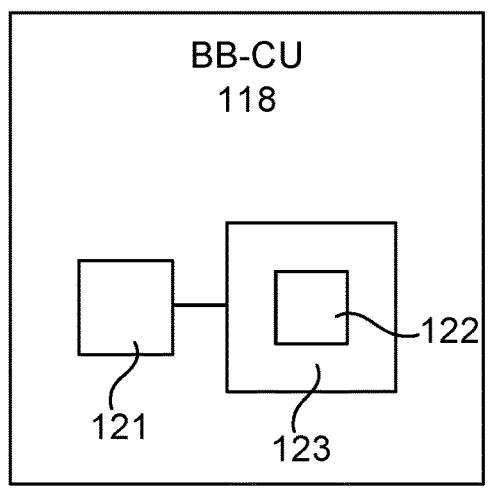
FIG. 8 illustrates a device configured to assigning data capacity to network slices in a mobile communications network according to an embodiment.

FIG. 8 illustrates a device configured to assigning data capacity to network slices in a mobile communications network according to an embodiment. In this example, the device is embodied in the form of the BB-CU 118, but could alternatively be embodied by the PGW/UPF 115, radio 116, or BB-DU 117. The BB-CU 117 and the BB-DU performs the method in both the uplink and the downlink, while the radio 116 performs the method in the uplink, and the PGW/UPF 115 performs the method in the downlink. The steps of the method performed by the BB-CU 118 are in practice performed by a processing unit 121 embodied in the form of one or more microprocessors arranged to execute a computer program 122 downloaded to a suitable storage volatile medium 123 associated with the microprocessor, such as a Random Access Memory (RAM), or a non-volatile storage medium such as a Flash memory or a hard disk drive. The processing unit 121 is arranged to cause the BB-CU 118 to carry out the method according to embodiments when the appropriate computer program 122 comprising computer-executable instructions is downloaded to the storage medium 123 and executed by the processing unit 121. The storage medium 123 may also be a computer program product comprising the computer program 122. Alternatively, the computer program 122 may be transferred to the storage medium 123 by means of a suitable computer program product, such as a Digital Versatile Disc (DVD) or a memory stick. As a further alternative, the computer program 122 may be downloaded to the storage medium 123 over a network. The processing unit 121 may alternatively be embodied in the form of a digital signal processor (DSP), an application specific integrated circuit (ASIC), a field-programmable gate array (FPGA), a complex programmable logic device (CPLD), etc.

Figure 9:
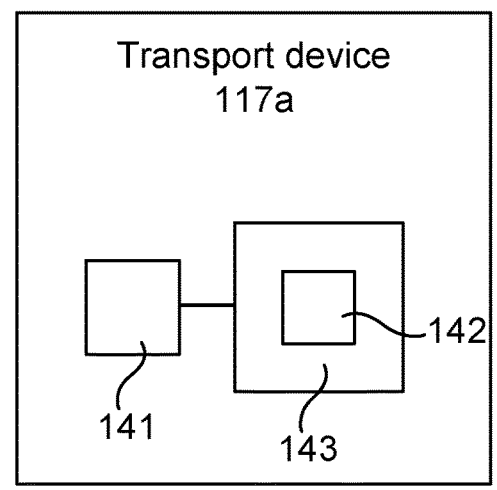
FIG. 9 illustrates a device configured to assigning data capacity to network slices in a mobile communications network according to another embodiment.

FIG. 9 illustrates a device configured to assigning data capacity to network slices in a mobile communications network according to an embodiment, in both the uplink and the downlink. In this example, the device is embodied in the form of the second transport device 117a (but could equally be embodied by the first transport device 116a or the third transport device 118a). The steps of the method performed by the transport device 117a are in practice performed by a processing unit 141 embodied in the form of one or more microprocessors arranged to execute a computer program 142 downloaded to a suitable storage volatile medium 143 associated with the microprocessor, such as a RAM, or a non-volatile storage medium such as a Flash memory or a hard disk drive. The processing unit 141 is arranged to cause the transport device 117a to carry out the method according to embodiments when the appropriate computer program 142 comprising computer-executable instructions is downloaded to the storage medium 143 and executed by the processing unit 141. The storage medium 143 may also be a computer program product comprising the computer program 142. Alternatively, the computer program 142 may be transferred to the storage medium 143 by means of a suitable computer program product, such as a DVD or a memory stick. As a further alternative, the computer program 142 may be downloaded to the storage medium 143 over a network. The processing unit 141 may alternatively be embodied in the form of a DSP, an ASIC, an FPGA, a CPLD, etc.

Figure 10:
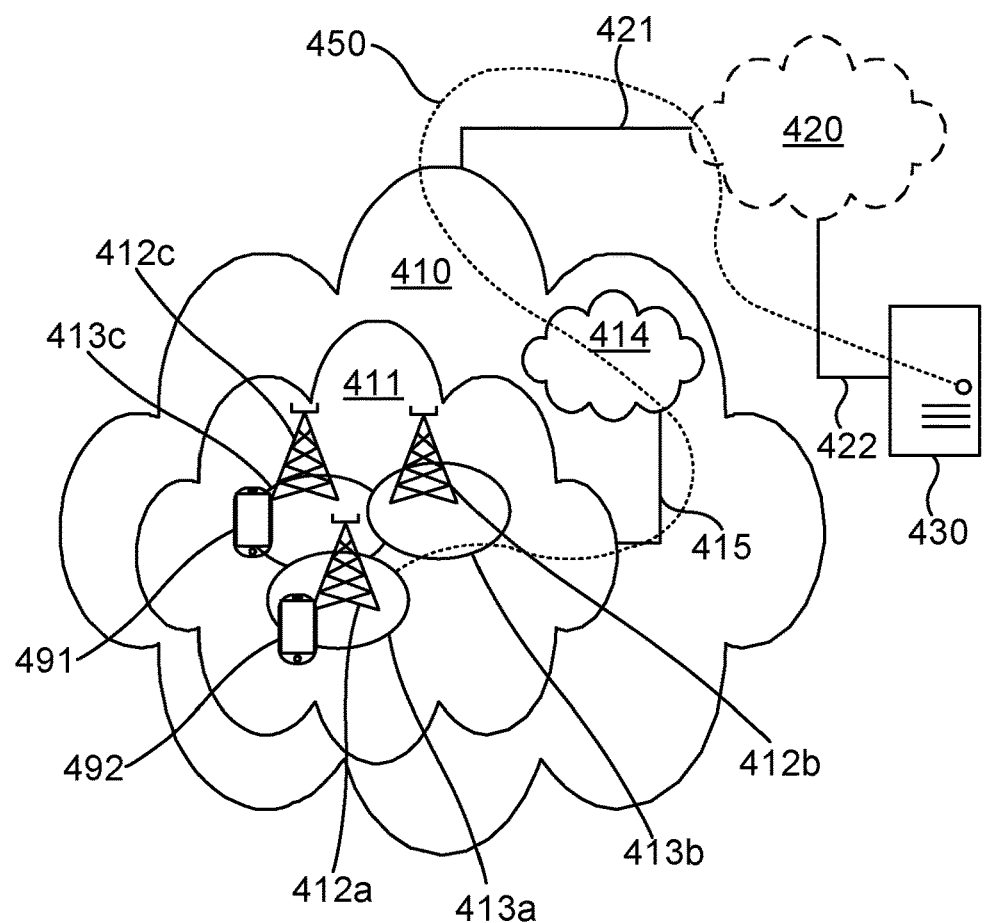
FIG. 10 is a schematic diagram illustrating a telecommunication network connected via an intermediate network to a host computer.

FIG. 10 is a schematic diagram illustrating a telecommunication network (such as that schematically illustrated in FIG. 1) connected via an intermediate network 420 to a host computer 430 in accordance with some embodiments. In accordance with an embodiment, a communication system includes telecommunication network 410, such as a 3GPP-type cellular network, which comprises access network 411, such as the RAN discussed in connection to FIG. 1, and core network 414, such as the core network discussed in connection to FIG. 1. Access network 411 comprises a plurality of radio access network nodes 412a, 412b, 412c, such as NBs, eNBs, gNBs (each corresponding to the RBS 102 of FIG. 1 or 2) or other types of wireless access points, each defining a corresponding coverage area, or cell, 413a, 413b, 413c. Each radio access network nodes 412a, 412b, 412c is connectable to core network 414 over a wired or wireless connection 415. A first UE 491 located in coverage area 413c is configured to wirelessly connect to, or be paged by, the corresponding network node 412c. A second UE 492 in coverage area 413a is wirelessly connectable to the corresponding network node 412a. While a plurality of UE 491, 492 are illustrated in this example, the disclosed embodiments are equally applicable to a situation where a sole UE is in the coverage area or where a sole terminal device is connecting to the corresponding network node 412. Each of the UEs 491, 492 correspond to the UE 101 of FIG. 1 or 2.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more subnetworks (not shown).

The communication system of FIG. 10 as a whole enables connectivity between the connected UEs 491, 492 and host computer 430. The connectivity may be described as an over-the-top (OTT) connection 450. Host computer 430 and the connected UEs 491, 492 are configured to communicate data and/or signalling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, network node 412 may not or need not be informed about the past routing of an incoming downlink communication with data originating from host computer 430 to be forwarded (e.g., handed over) to a connected UE 491. Similarly, network node 412 need not be aware of the future routing of an outgoing uplink communication originating from the UE 491 towards the host computer 430.

The aspects of the present disclosure have mainly been described above with reference to a few embodiments and examples thereof. However, as is readily appreciated by a person skilled in the art, other embodiments than the ones disclosed above are equally possible within the scope of the invention, as defined by the appended patent claims.

Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method of assigning data capacity to network slices in a mobile communications network, comprising:
   acquiring identifiers of the network slices managed by a device, an indication of types of services being provided in the network slices, number of data radio bearers (DRBs) served by each network slice and number of DRBs served by each service type in each network slice;
   adding the acquired identifiers, indication of types of services being provided, number of DRBs served by each network slice and number of DRBs served by each service type in each network slice in a header of a transport protocol utilized in the mobile communications network;
   computing a slice weight for the data capacity to be assigned to each network slice as a product of an initial weight indicating the data capacity being assigned to said each network slice and the number of DRBs served by said each network slice divided by a sum, for all network slices managed by the device, of the product of the initial weight indicating the data capacity being assigned to an individual network slice and the number of DRBs served by the individual network slice; and
   assigning the data capacity to said each network slice in accordance with the computed slice weight.

2. The method of claim 1, wherein the computing of the slice weight further comprises taking into account an available data capacity of the device with respect to a maximum data capacity of the device.

3. The method of claim 1, further comprising:
   computing a service type weight for the data capacity to be assigned to each service type in each network slice as a product of an initial weight indicating the data capacity being assigned to said each service type in each network slice and the number of DRBs served said each service type in each network slice divided by the sum, for all service types in each network slice managed by the device, of the product of the initial weight indicating the data capacity being assigned to an individual service type in each network slice and the number of DRBs served by the individual network slice; and
   assigning the data capacity to said each service type in each network slice in accordance with the computed service type weight.

4. The method of claim 3, wherein the computing of the service type weight further comprises taking into account an available network slice data capacity provided by the device.

5. The method of claim 3, wherein the assigning of the data capacity to said each service type in each network slice in accordance with the computed service type weight further comprises:
   taking into account a minimum allowable data capacity to be assigned, wherein in case the computed service type weight for any network service type of a particular network slice indicates that less than the minimum allowable data capacity is to be assigned, data capacity is reallocated from one or more other network service types of said particular network slice such that the data capacity assigned to any network slice is not below the minimum allowable data capacity.

6. The method of claim 3, wherein the assigning of the data capacity to said each service type in each network slice in accordance with the computed service type weight further comprises:
   taking into account a maximum allowable data capacity to be assigned, wherein in case the computed service type weight for any network service type of a particular network slice indicates that more than the maximum allowable data capacity is to be assigned, data capacity is reallocated one or more other network service types of said particular network slice such that the data capacity assigned to any network slice does not exceed the maximum allowable data capacity.

7. The method of claim 1, wherein the assigning of the data capacity to said each network slice in accordance with the computed slice weight further comprises:
   taking into account a minimum allowable data capacity to be assigned, wherein in case the computed slice weight for any network slice indicates that less than the minimum allowable data capacity is to be assigned, data capacity is reallocated from one or more other network slices such that the data capacity assigned to said any network slice is not below the minimum allowable data capacity.

8. The method of claim 1, wherein the assigning of the data capacity to said each network slice in accordance with the computed slice weight further comprises:
taking into account a maximum allowable data capacity to be assigned, wherein in case the computed slice weight for any network slice indicates that more than the maximum allowable data capacity is to be assigned, data capacity is reallocated from said any network slice to one or more other network slices such that the data capacity assigned to said any network slice does not exceed the maximum allowable data capacity.

9. A method of assigning data capacity to network slices in a wireless communications network, comprising:
acquiring identifiers of the network slices managed by a device, an indication of types of services being provided in the network slices, number of data radio bearers (DRBs) served by each network slice and number of DRBs served by each service type in each network slice available in a header of a transport protocol utilized in the wireless communications network;
computing a slice weight for the data capacity to be assigned to each network slice as a product of an initial weight indicating the data capacity being assigned to said each network slice and the number of DRBs served by said each network slice divided by a sum, for all network slices managed by the device, of the product of the initial weight indicating the data capacity being assigned to an individual network slice and the number of DRBs served by the individual network slice; and
assigning the data capacity to said each network slice in accordance with the computed slice weight.

10. The method of claim 9, further comprising:
computing a service type weight for the data capacity to be assigned to each service type in each network slice as a product of an initial weight indicating the data capacity being assigned to said each service type in each network slice and the number of DRBs served said each service type in each network slice divided by the sum, for all service types in each network slice managed by the device, of the product of the initial weight indicating the data capacity being assigned to an individual service type in each network slice and the number of DRBs served by the individual network slice; and
assigning the data capacity to said each service type in each network slice in accordance with the computed service type weight.

11. A device to assign data capacity to network slices in a wireless communications network, the device comprising:
a processing unit; and
a memory, said memory containing instructions which, when executed by said processing unit, cause the device to:
acquire identifiers of the network slices managed by the device, an indication of types of services being provided in the network slices, number of data radio bearers (DRBs) served by each network slice and number of DRBs served by each service type in each network slice;
add the acquired identifiers, indication of types of services being provided, number of DRBs served by each network slice and number of DRBs served by each service type in each network slice in a header of a transport protocol utilized in the wireless communications network;
compute a slice weight for the data capacity to be assigned to each network slice as a product of an initial weight indicating the data capacity being assigned to said each network slice and the number of DRBs served by said each network slice divided by a sum, for all network slices managed by the device, of the product of the initial weight indicating the data capacity being assigned to an individual network slice and the number of DRBs served by the individual network slice; and
assign the data capacity to said each network slice in accordance with the computed slice weight.

12. The device of claim 11, when computing the slice weight, further to take into account an available data capacity of the device with respect to a maximum data capacity of the device.

13. The device of claim 11, further to:
compute a service type weight for the data capacity to be assigned to each service type in each network slice as a product of an initial weight indicating the data capacity being assigned to said each service type in each network slice and the number of DRBs served said each service type in each network slice divided by the sum, for all service types in each network slice managed by the device, of the product of the initial weight indicating the data capacity being assigned to an individual service type in each network slice and the number of DRBs served by the individual network slice; and
assign the data capacity to said each service type in each network slice in accordance with the computed service type weight.

14. The device of claim 13, when computing the service type weight, further to take into account an available network slice data capacity provided by the device.

15. The device of claim 13, further to, when assigning the data capacity to said each service type in each network slice in accordance with the computed service type weight:
take into account a minimum allowable data capacity to be assigned, wherein in case the computed service type weight for any network service type of a particular network slice indicates that less than the minimum allowable data capacity is to be assigned, data capacity is reallocated from one or more other network service types of said particular network slice such that the data capacity assigned to any network slice is not below the minimum allowable data capacity.

16. The device of claim 13, further to, when assigning the data capacity to said each service type in each network slice in accordance with the computed service type weight:
take into account a maximum allowable data capacity to be assigned, wherein in case the computed service type weight for any network service type of a particular network slice indicates that more than the maximum allowable data capacity is to be assigned, data capacity is reallocated one or more other network service types of said particular network slice such that the data capacity assigned to any network slice does not exceed the maximum allowable data capacity.

17. The device of claim 11, further to, when assigning the data capacity to said each network slice in accordance with the computed slice weight:
take into account a minimum allowable data capacity to be assigned, wherein in case the computed slice weight for any network slice indicates that less than the minimum allowable data capacity is to be assigned, data capacity is reallocated from one or more other network slices such that the data capacity assigned to said any network slice is not below the minimum allowable data capacity.

18. The device of claim 11, further to, when assigning the data capacity to said each network slice in accordance with the computed slice weight:
take into account a maximum allowable data capacity to be assigned, wherein in case the computed slice weight for any network slice indicates that more than the maximum allowable data capacity is to be assigned, data capacity is reallocated from said any network slice to one or more other network slices such that the data capacity assigned to said any network slice does not exceed the maximum allowable data capacity.

19. A device to assign data capacity to network slices in a wireless communications network, the device comprising:
a processing unit; and
a memory, said memory containing instructions which, when executed by said processing unit, cause the device to:
acquire identifiers of the network slices managed by the device, an indication of types of services being provided in the network slices, number of data radio bearers (DRBs) served by each network slice and number of DRBs served by each service type in each network slice available in a header of a transport protocol utilized in the wireless communications network;
compute a slice weight for the data capacity to be assigned to each network slice as a product of an initial weight indicating the data capacity being assigned to said each network slice and the number of DRBs served by said each network slice divided by a sum, for all network slices managed by the device, of the product of the initial weight indicating the data capacity being assigned to an individual network slice and the number of DRBs served by the individual network slice; and
assign the data capacity to said each network slice in accordance with the computed slice weight.

20. The device of claim 19, further comprising:
compute a service type weight for the data capacity to be assigned to each service type in each network slice as a product of an initial weight indicating the data capacity being assigned to said each service type in each network slice and the number of DRBs served said each service type in each network slice divided by the sum, for all service types in each network slice managed by the device, of the product of the initial weight indicating the data capacity being assigned to an individual service type in each network slice and the number of DRBs served by the individual network slice; and
assign the data capacity to said each service type in each network slice in accordance with the computed service type weight.

* * * * *